United States Patent

Snidar

[15] 3,635,508
[45] Jan. 18, 1972

[54] BALL JOINT STATIC SEAL FOR HIGH-ANGLE APPLICATIONS

[72] Inventor: Edward A. Snidar, Ann Arbor, Mich.
[73] Assignee: O & S Bearing & Mfg. Co., Whitmore Lake, Mich.
[22] Filed: Nov. 28, 1969
[21] Appl. No.: 880,645

[52] U.S. Cl. ...................................................287/87
[51] Int. Cl. ..........................................F16c 11/06
[58] Field of Search ..................287/87, 90 A, 90 C, 88; 277/212 FB

[56] References Cited

UNITED STATES PATENTS

| | | | |
|---|---|---|---|
| 2,885,248 | 5/1959 | White | 287/90 R |
| 2,752,180 | 6/1956 | Vogt | 287/87 |
| 3,004,786 | 10/1961 | Herbenar | 287/90 A |
| 3,030,134 | 4/1962 | Gair | 287/88 |
| 3,086,792 | 4/1963 | Schultz | 287/88 X |
| 3,091,486 | 5/1963 | Baker | 287/87 |
| 3,260,543 | 7/1966 | Henry-Biabaud | 287/87 |
| 3,451,700 | 6/1969 | Smith | 287/90 A |
| 3,343,857 | 9/1967 | Cislo | 287/90 C |

FOREIGN PATENTS OR APPLICATIONS

| | | | |
|---|---|---|---|
| 494,650 | 10/1938 | Great Britain | 287/90 C |
| 662,676 | 12/1951 | Great Britain | 287/90 C |
| 1,268,690 | 6/1961 | France | 277/212 FB |

*Primary Examiner*—Andrew V. Kundrat
*Attorney*—Barnes, Kisselle, Raisch & Choate

[57] ABSTRACT

A flexible, cuplike seal for a ball joint having the larger rim adapted to surround and be secured to the outer surface of a ball joint socket and the central aperture therein in the base of the cup surrounding the stud of the ball element, the central opening having an axially extending wall directed to the ball in assembly to prevent movement of the dust seal into the area where it might be pinched in high-angle motion of the ball and stud relative to the ball socket. The walls of the seal are provided with undulations to facilitate the stretching and collapsing which results from the motion of the joint.

2 Claims, 2 Drawing Figures

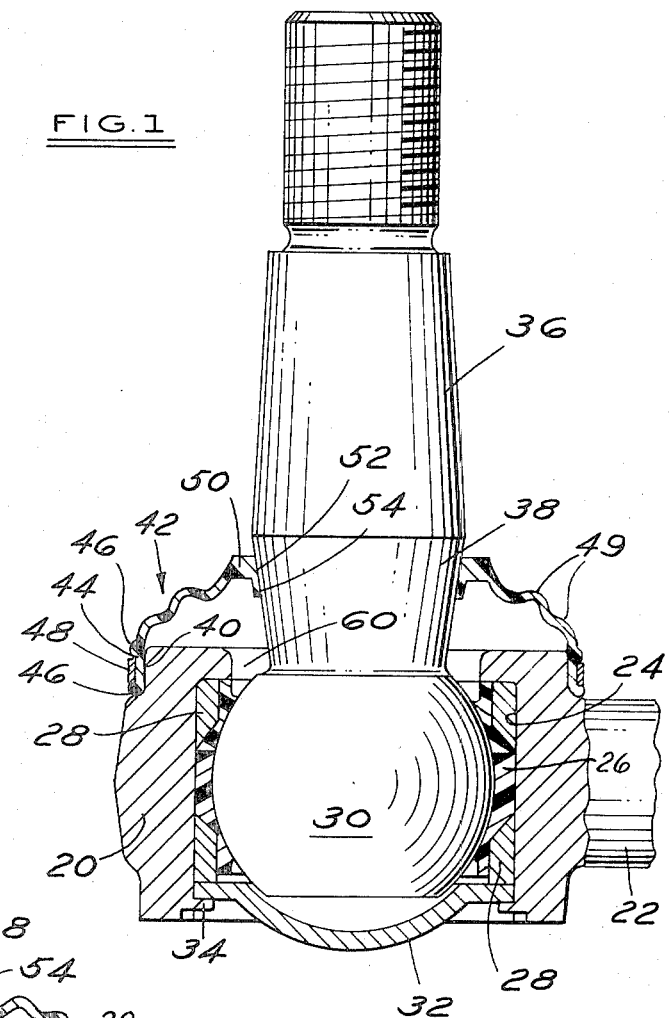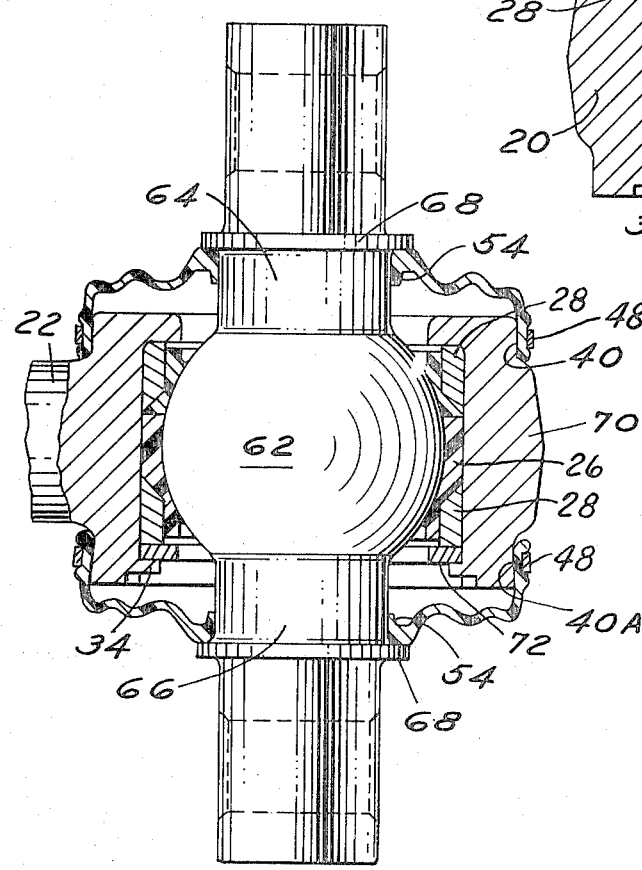

BALL JOINT STATIC SEAL FOR HIGH-ANGLE APPLICATIONS

This invention relates to a ball joint static seal for high angle applications.

One of the problems in previous designs of the cuplike static seals which are intended to exclude dirt and moisture from a ball and socket joint has been that in high angle joints the seals have a tendency to collapse into the joint and become worn, torn or cut by the mechanical pressure that results. Molded steel rings have been used at both the large and small ends of the seals in an attempt to prevent this destruction on ball studs with a large amount of back taper which is necessary for high angle applications but the location of the seal is difficult because the small end of the seal tends to move down the back taper and reduces the sealing effect of the small diameter of the seal against the ball stud.

The present invention has as its object a flexible seal which can be utilized on high angle ball studs without mechanical interference or destruction.

It is a further object of the invention to provide a seal design which prevents mechanical interference between the walls of the seal and the pinching portions of the joint and one which is also shaped to allow full motion without undue stretching or tension on the anchoring portions.

It is another object of the invention to provide a seal wherein the small opening surrounding the ball stud is designed to cling to the ball stud and also to prevent motion of the walls of the seal into the danger area of the joint.

Still another object of the invention is a construction which can be readily clamped to the socket element, thus eliminating the use of ribs and reinforcements to transmit holding pressure from the stud to the socket.

Other objects and features of the invention will be apparent in the following description and claims wherein the principles of operation and the manner of use of the invention are set forth together with the best mode of the invention presently contemplated. Drawings accompany the disclosure and the various views thereof may be briefly described as:

FIG. 1, a sectional view illustrating an assembly of a ball stud and socket with the seal of the present invention.

FIg. 2, a similar sectional view showing a double-ended ball stud sometimes called a straddle ball.

REFERRING TO THE DRAWINGS

In FIG. 1, a ball stud socket 20 is shown with a mounting arm 22 having a main recess 24 in which is mounted a plastic bearing insert 26 backed at each end by a lubricant impregnated ring 28 of fibrous material. It may be assumed, for the purposes of this discussion, that this is a standard bearing mount for the ball stud 30, the assembly being confined by an end disc 32 which is staked circumferentially at 34 to hold the bearing parts in compression in the main recess 24 of the ball stud socket 20.

The ball has a shank or a stud portion 36 with a tapered portion 38 directly adjacent the socket to allow what is sometimes referred to as wide angle motion. It will be noted that the top portion of the socket 20 has an outside wall 40 which is essentially cylindrical, that is, a straight wall parallel to the axis of the joint. This wall might also have a negative angle, that is, be slanted inwardly as shown at 40A in FIG. 2. This is created by cold or hot working the seal mounting area 40 subsequent to the forging operation to eliminate the draft angle inherent in the manufacturing process.

This area 40 provides a mounting surface for the open end of the cup-shaped seal designated generally at 42, the large end 44 being fitted onto the wall 40, this end having axially spaced circumferential rib or ribs 46. The large end 44 is clamped to the outside wall of the socket by a magnetically formed retaining ring 48 or some other suitable clamping ring.

It will be noted that the walls of the cup seal 42 are provided with annular steps or, in cross section, undulations 49 which are formed into the unit to guide the stretching and folding process while preventing inward collapsing of the walls when the ball stud is moved at an angle. The bottom end 50 of the inverted cup is generally thicker around the opening 52 than the walls of the cup seal. The thickened bottom wall 50 has an inwardly extending collar 54 which in assembly conforms to the taper 38 of the ball stud and extends toward the ball 30. The material from which the dust seal is formed is preferably a suitable thermoplastic or thermoset material such as polyurethane. The material is such that the opening 52 can be stretched around the ball stud as shown in the position in FIG. 1 and should it be that the bottom 52 would work its way down the taper, it would still have a snug fit around this portion of the stud.

The collar 54, if it works down toward the ball, will prevent the seal itself from entering the space which is generally designated at 60. The lower end of the collar will contact the ball and prevent further inward motion of the seal. There is adequate material in the undulated wall of the sealing cup to allow for the wide angle motion of the stud, but it does not become entrapped in the closing space of the stud so that it will be worn or cut or torn from the mechanical abrasion that would otherwise result.

While it may be that the collar 54 will be pinched at times, this will not destroy the seal or the function of the collar in spacing the dust seal upwardly. In FIG. 2, a similar type of seal is shown for use on a double-ended ball stud where the ball 62 has two straight stud portions 64 and 66 at each end terminating at the ball at one end and at an annular flange 68 at the other end. The socket 70 is somewhat similar to that shown in FIG. 1 with the exception that a ring 72 is used to hold the parts in assembly at the lower end. In this embodiment the collar 54 serves the same function in that should the dust seal work inwardly toward the ball, the collar 54 would space it outwardly to deep the dust seal from being entrapped between the ball stud 64 or 66 and the adjacent portions of the socket.

The importance of the seal, of course, is recognized in that many of the joints that are used with the ball and socket construction are not intended to be lubricated throughout the life time of a vehicle. Accordingly, it is important that contaminants such as water, dust, and abrasive material, be excluded from the joint. If the dust cup seal is broken by the constant action or by the mechanical abrasion above described, the life of the seal is materially reduced. Accordingly, it is important that the seal function as described in connection with the present invention to provide a life time protection.

What is claimed as new is as follows:

1. A dust seal for a ball and socket joint which comprises a molded unitary, flexible cuplike member having relatively thin walls with a large open end with an edge having a thickness approximately the same as the thickness of the walls of the cuplike member adapted to be secured peripherally to the outer walls of a socket, and a small end having an opening to receive a tapered shank of a ball stud, the periphery of said opening being thickened radially and axially relative to the thickness of said wall to form a ring to be stretched around and sealed against a ball stud shank, and a standoff collar having the length thereof a relatively thin and uniform radial thickness compared to said ring such that pinching of said collar can occur without adversely effecting the sealing ring portion of the seal, said collar extending from the bottom of said ring contiguous with the inner periphery thereof and in the direction of the axis of said cup about a third of the axial length of the cup, said walls of the cuplike member between the ends being formed with a plurality of shallow undulations to accommodate a high angle shift of the small end relative to the large end in a direction transverse to the axis.

2. In combination a high-angle ball and socket joint which comprises:

a. a ball and socket assembly comprising a ball having a shank narrowed to a minor diameter at the juncture with the ball and tapering outwardly to a major diameter spaced from the ball, and a socket for said ball having an outer annular surface adjacent an end from which the ball stud projects for anchoring and clamping a lip of a cup seal, and b. a dust seal which comprises a molded cuplike member free of reinforcing inserts with relatively thin unitary flexible walls having a large open end with an annular lip edge having approximately the thickness of the flexible walls fitting over and secured to said annular surface, and a small end having an opening to receive said tapered shank of said ball stud, the periphery of said opening being relatively thick axially and radially compared to the thickness of said flexible walls to form a sealing ring dimensioned to be stretched around said tapering portion to have a sealing fit at either the minor or major diameters or intermediate portions of said tapered shank, and a standoff collar embracing said tapered portion and having the length thereof a relatively thin and uniform radial thickness in comparison to said ring such that pinching of said collar can occur without adversely effecting the sealing ring portion of the seal, said collar extending from the bottom of said ring contiguous with the inner periphery thereof and in the direction of the axis of said cup about a third of the distance of the normal axial length of said ends, said walls of the cuplike member being formed with a plurality of shallow undulations to accommodate a high angle shift of the small end relative to the large end in a direction transverse to the axis of the cup and the joint, said standoff collar being adapted to contact said ball in a high angle shift of said joint to maintain said sealing ring and said walls in spaced relation to said ball and said socket to prevent mechanical entrapment of said ring and said walls between said shank and said socket.

* * * * *